Figure 1:
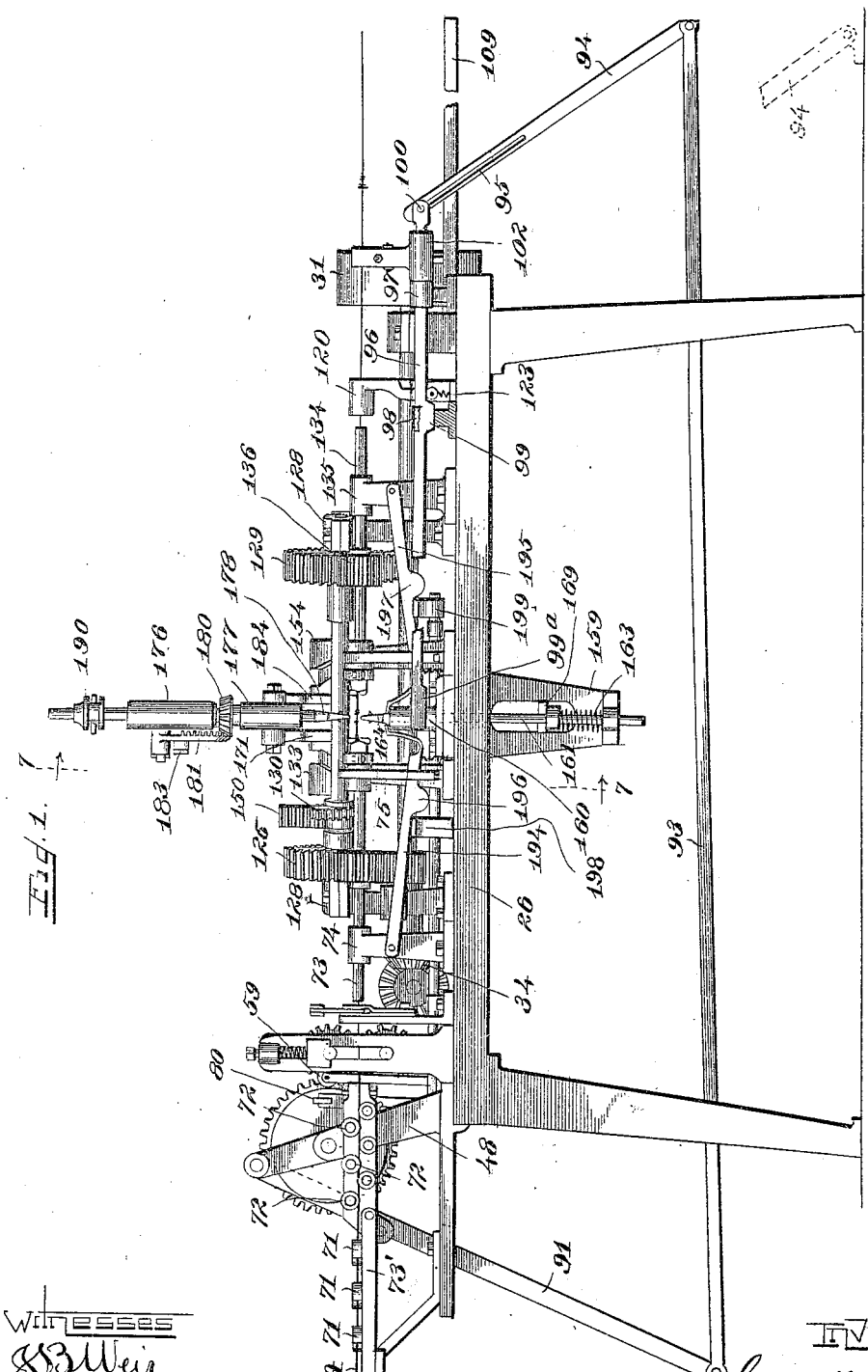

No. 658,800. Patented Oct. 2, 1900.
J. W. PARKER.
MACHINE FOR MAKING CHECK ROWER WIRE.
(Application filed July 5, 1900.)

(No Model.) 8 Sheets—Sheet 1.

No. 658,800. Patented Oct. 2, 1900.
J. W. PARKER.
MACHINE FOR MAKING CHECK ROWER WIRE.
(Application filed July 5, 1900.)

(No Model.) 8 Sheets—Sheet 2.

No. 658,800. Patented Oct. 2, 1900.
J. W. PARKER.
MACHINE FOR MAKING CHECK ROWER WIRE.
(Application filed July 5, 1900.)

(No Model.) 8 Sheets—Sheet 3.

Witnesses
BJWeir
Ira D. Perry

Inventor
James W. Parker
by Bond, Adams, Pickard
Jackson
Att'ys

No. 658,800. Patented Oct. 2, 1900.
J. W. PARKER.
MACHINE FOR MAKING CHECK ROWER WIRE.
(Application filed July 5, 1900.)
(No Model.) 8 Sheets—Sheet 4.

No. 658,800. Patented Oct. 2, 1900.
J. W. PARKER.
MACHINE FOR MAKING CHECK ROWER WIRE.
(Application filed July 5, 1900.)
(No Model.)
8 Sheets—Sheet 5.

Witnesses
JB Weir
Ira D. Perry

Inventor
James W. Parker
by Bond, Adams, Pickard & Jackson
Attys

No. 658,800. Patented Oct. 2, 1900.
J. W. PARKER.
MACHINE FOR MAKING CHECK ROWER WIRE.
(Application filed July 5, 1900.)
(No Model.) 8 Sheets—Sheet 6.
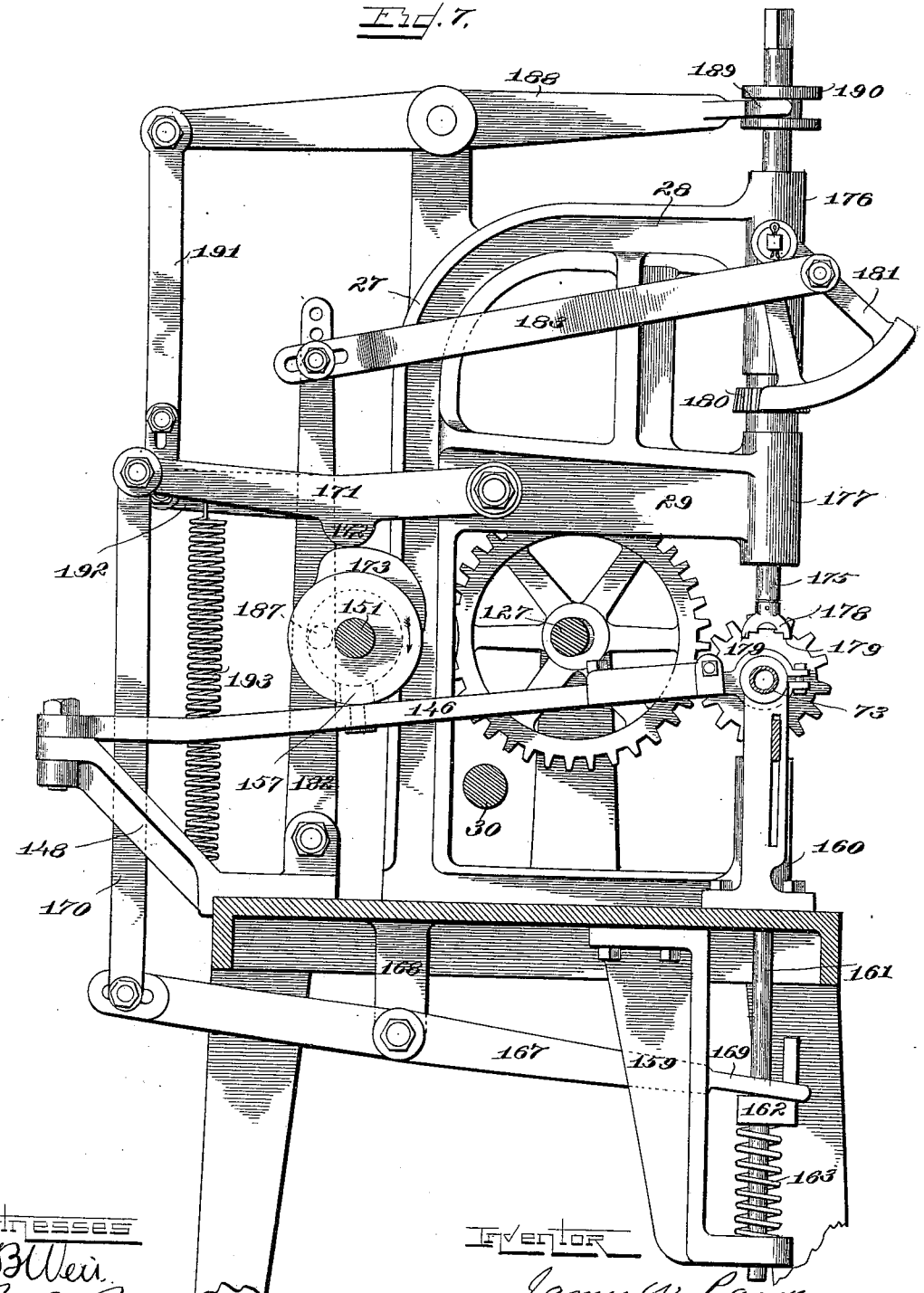

No. 658,800. Patented Oct. 2, 1900.
J. W. PARKER.
MACHINE FOR MAKING CHECK ROWER WIRE.
(Application filed July 5, 1900.)
(No Model.) 8 Sheets—Sheet 7.
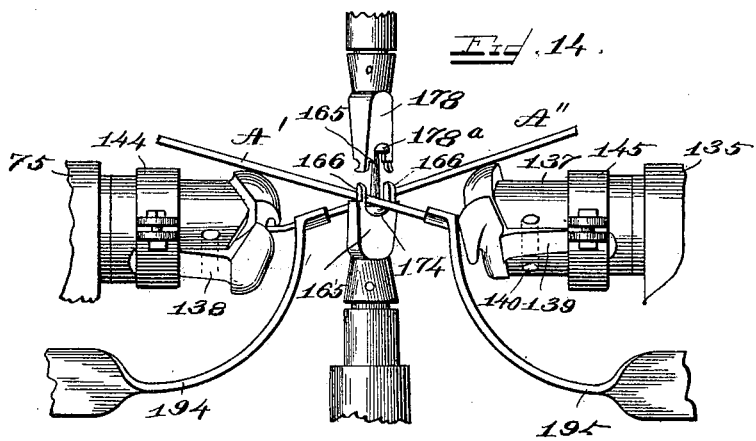
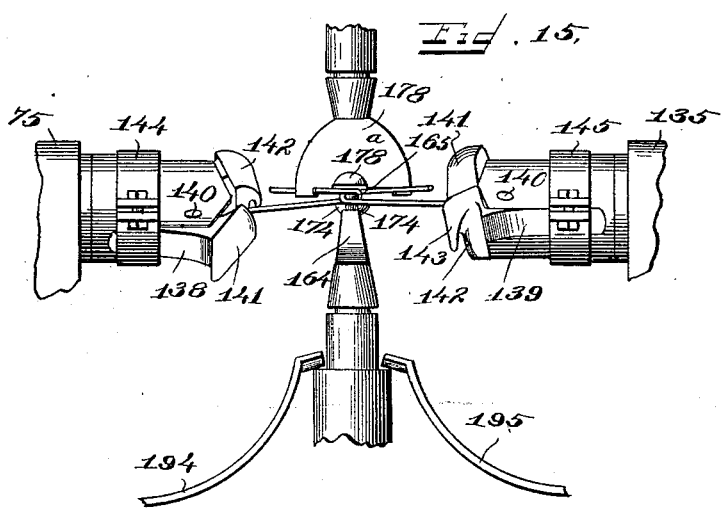
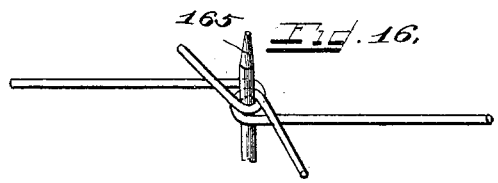

No. 658,800. Patented Oct. 2, 1900.
J. W. PARKER.
MACHINE FOR MAKING CHECK ROWER WIRE.
(Application filed July 5, 1900.)
(No Model.) 8 Sheets—Sheet 8.
Fig. 17.
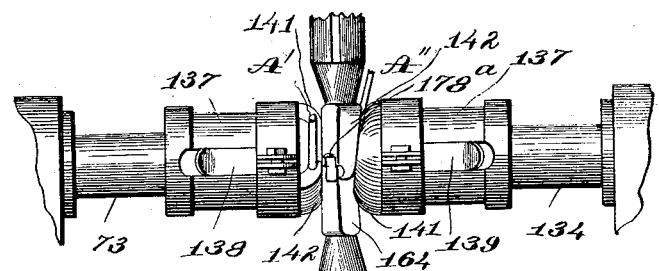
Fig. 19. 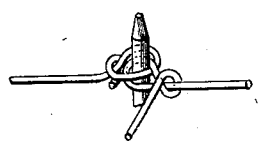 Fig. 21. 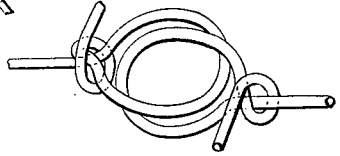
Fig. 18.
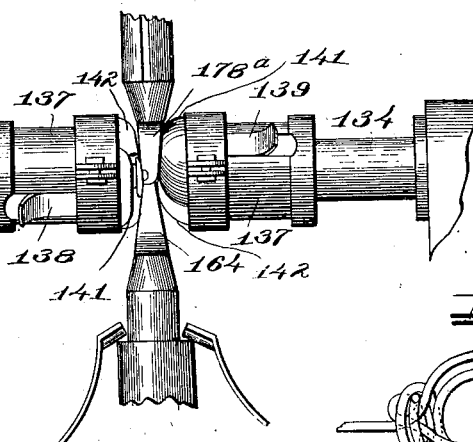
Fig. 20. 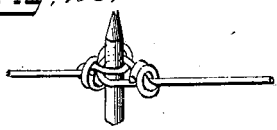 Fig. 22. 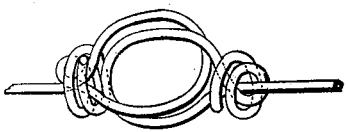
Witnesses Fig. 23. Inventor
James W. Parker
by
Bond, Adams
Pickard & Jackson
Attys

UNITED STATES PATENT OFFICE.

JAMES W. PARKER, OF ROCK ISLAND, ILLINOIS, ASSIGNOR TO JAMES EDWARD BERING, WILLIAM J. QUINLAN, AND WILSON M. BERING, OF DECATUR, ILLINOIS.

MACHINE FOR MAKING CHECK-ROWER WIRE.

SPECIFICATION forming part of Letters Patent No. 658,800, dated October 2, 1900.

Application filed July 5, 1900. Serial No. 22,617. (No model.)

*To all whom it may concern:*

Be it known that I, JAMES W. PARKER, a citizen of the United States, residing at Rock Island, in the county of Rock Island and State of Illinois, have invented certain new and useful Improvements in Machines for Manufacturing Check-Rower Wire, of which the following is a specification, reference being had to the accompanying drawings.

My invention relates to machines for the manufacture of check-rower wire, and particularly to machinery adapted to manufacture the check-rower wire shown and described in Letters Patent of the United States to me, No. 578,830, of March 16, 1897; and its object is to provide new and improved automatic machinery for the manufacture of check-rower wire, and particularly of the check-rower wire described in said Letters Patent.

Another object of my invention is to provide a new and improved twister-head for coiling the end of the check-rower wire upon the body thereof for the purpose of forming a knot or tappet adapted to contact with the fork of the check-rower.

A further object of my invention is to improve machinery for the manufacture of check-rower wire in sundry details, hereinafter pointed out.

I accomplish these objects as hereinafter specified and as illustrated in the drawings.

That which I regard as new will be set forth in the claims.

Figure 2:
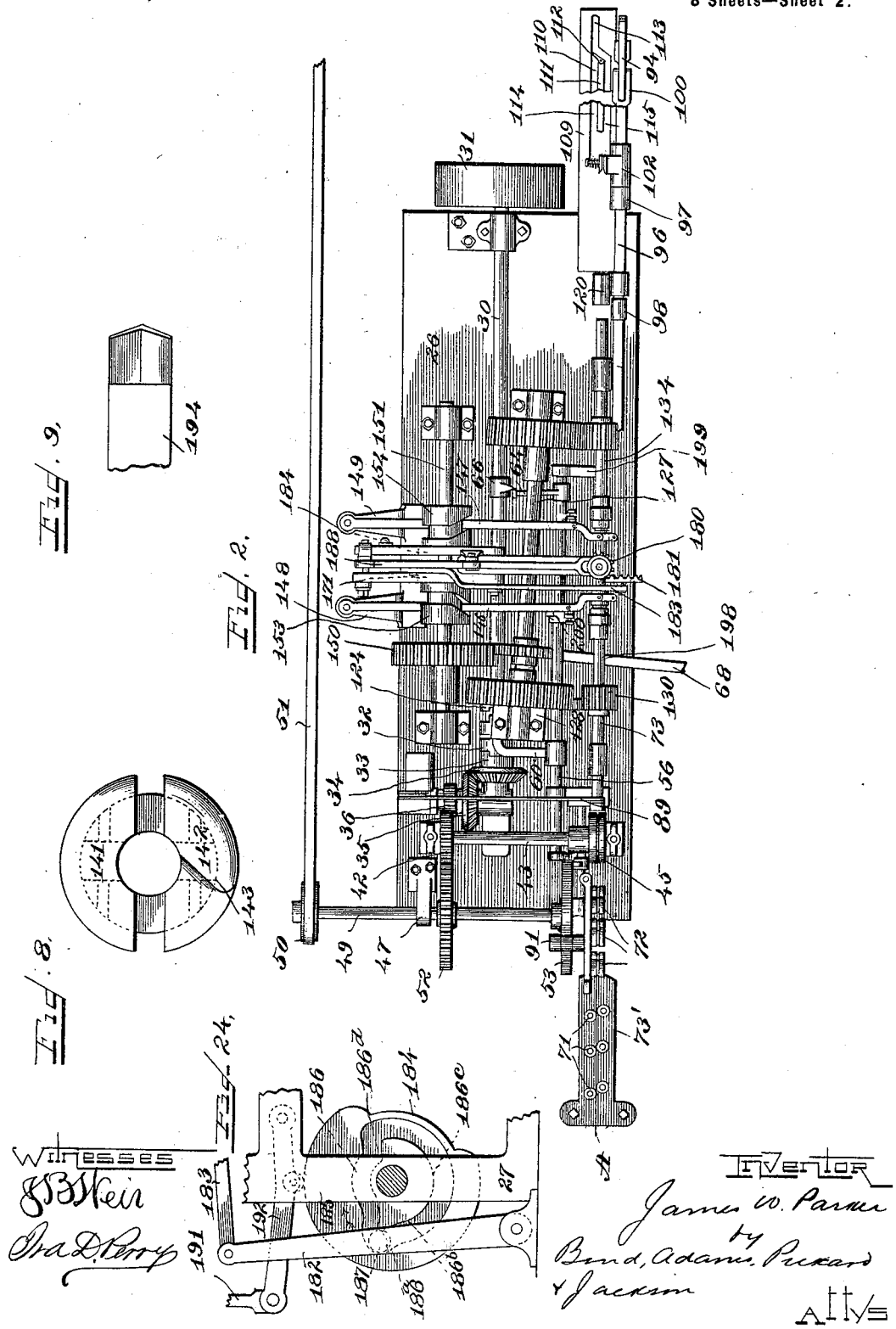
Figure 3:
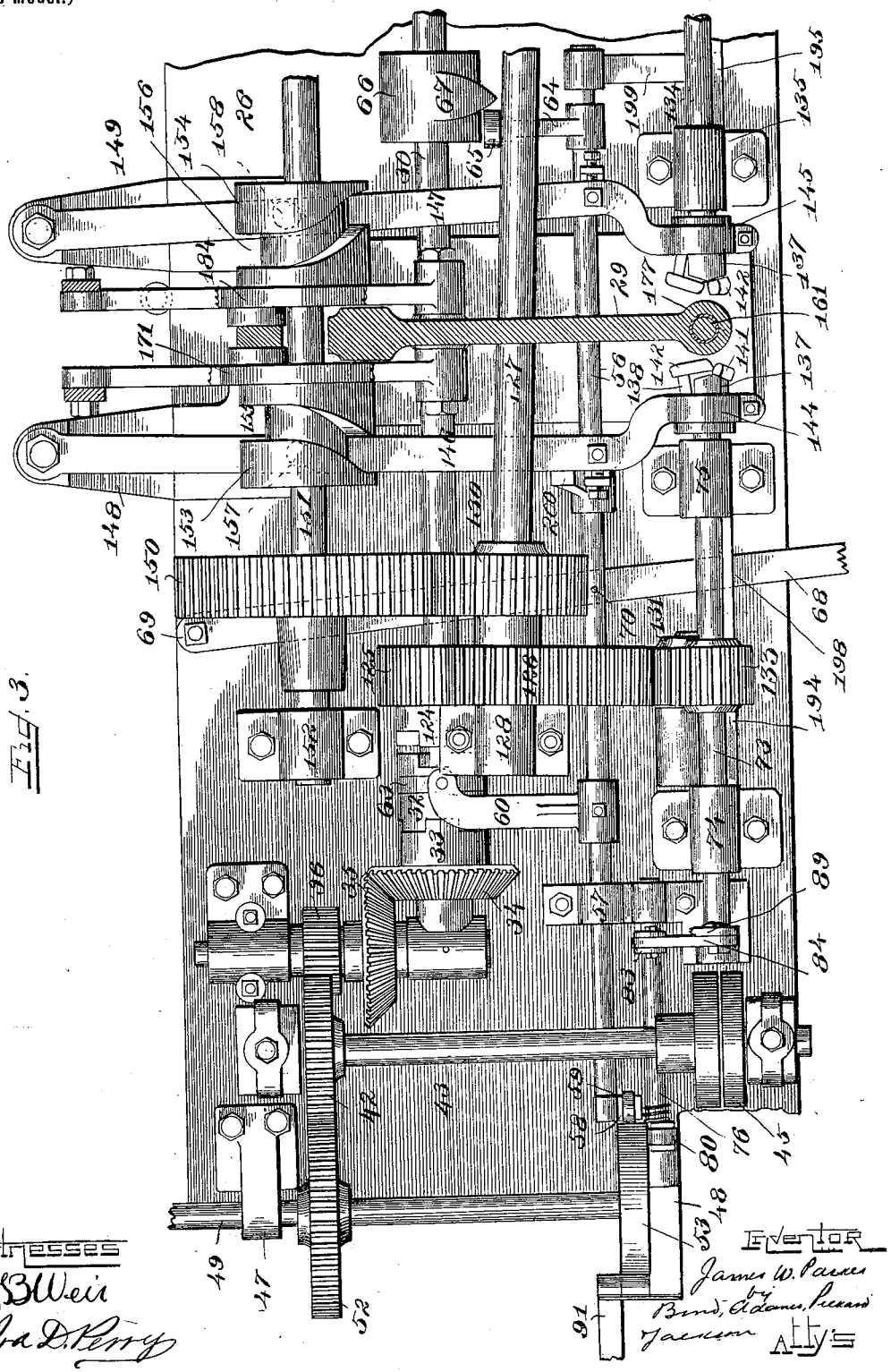
Figure 4:
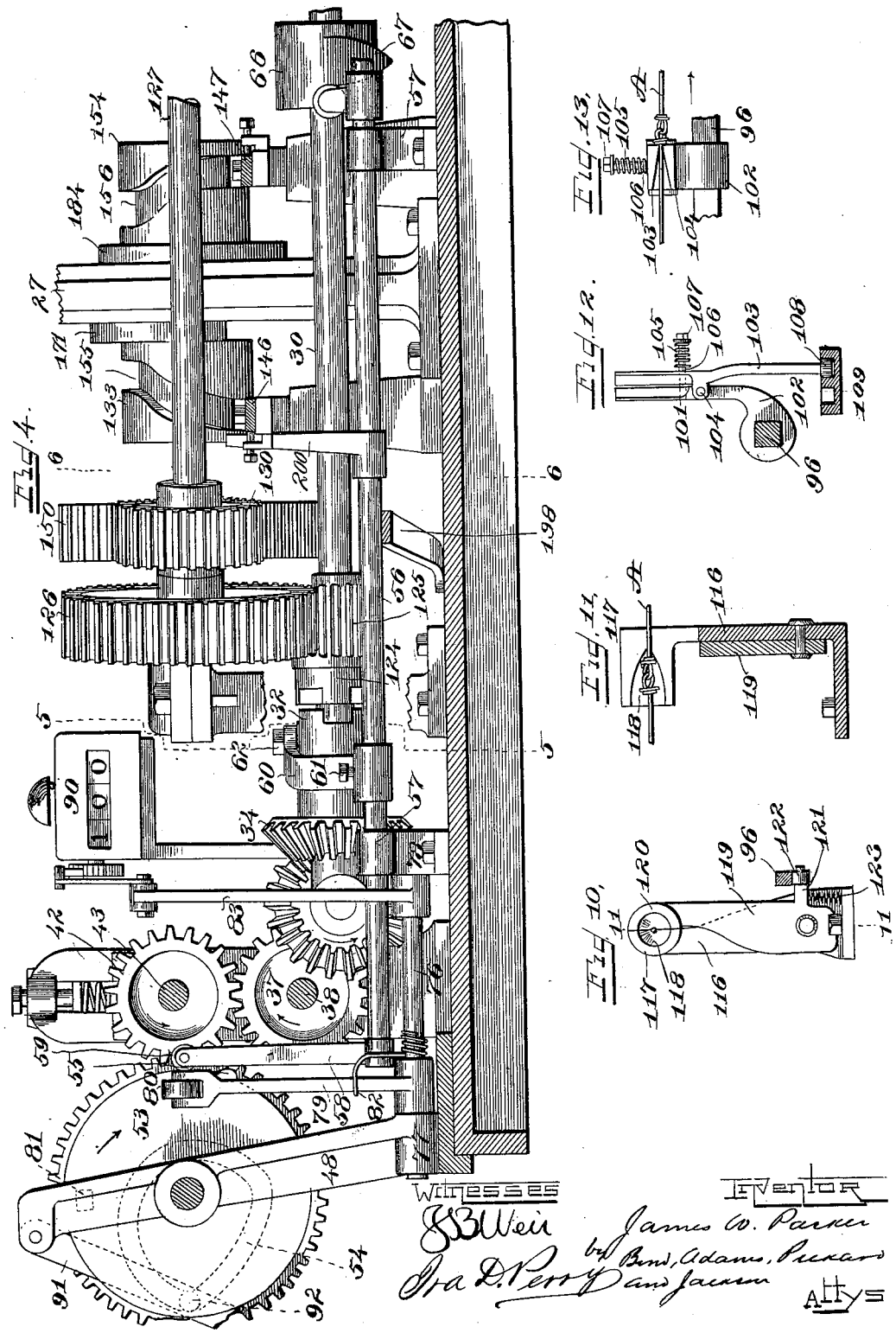
Figure 5:
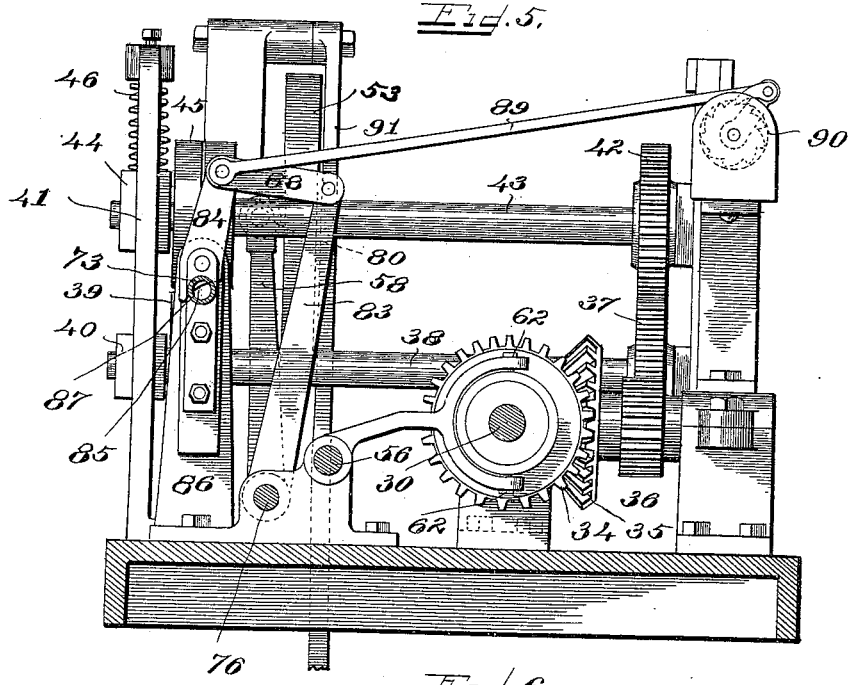
Figure 6:
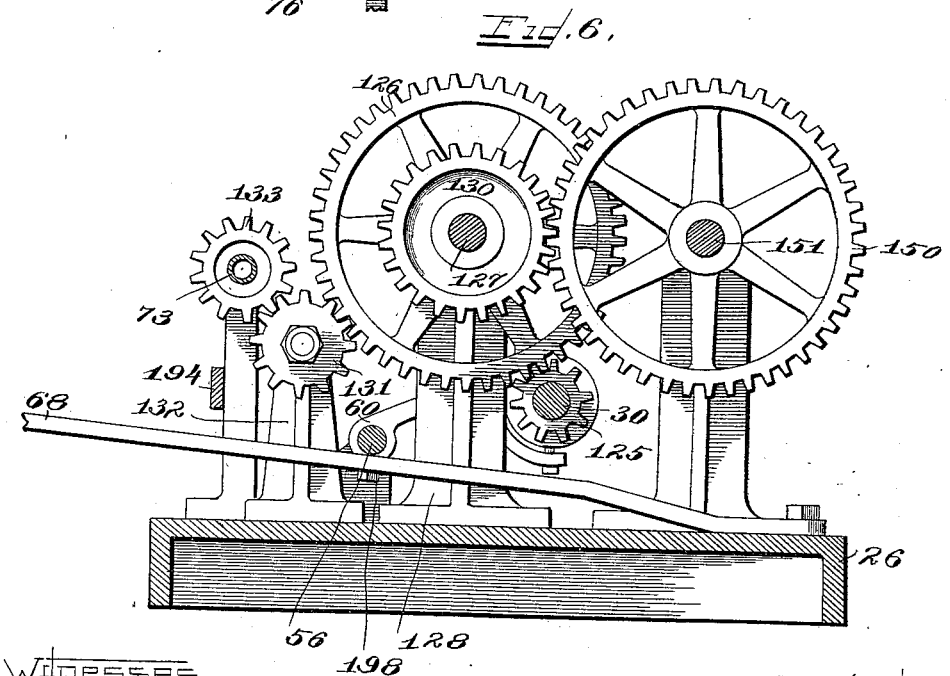

In the accompanying drawings, Figure 1 is a front elevation of my machine. Fig. 2 is a top or plan view of the same. Fig. 3 is an enlarged detail, being a top or plan view of a portion of said machine partially in section and with some of the upper portions removed. Fig. 4 is an enlarged detail, being a front view of the parts shown in top or plan view in Fig. 3. Fig. 5 is an enlarged detail, being a vertical cross-section on line 5 5 of Fig. 4. Fig. 6 is an enlarged detail, being a vertical cross-section on line 6 6 of Fig. 4. Fig. 7 is an enlarged detail, being a vertical cross-section on line 7 7 of Fig. 1. Fig. 8 is an enlarged detail, being an end view of one of the coiler-heads. Fig. 9 is an enlarged detail, being a top or plan view of one of the adjustable guides for guiding the wire into position. Fig. 10 is an enlarged detail, being an end view of one of the wire-holding devices. Fig. 11 is an enlarged detail, being a vertical section on line 11 11 of Fig. 10. Fig. 12 is an enlarged detail, being an end view of the device for drawing the finished wire through the machine. Fig. 13 is an enlarged detail, being a top or plan view of the device shown in Fig. 12. Figs. 14 and 15 are enlarged details, being views of the interlocking eye-forming mechanism and of the coiler or twister heads in two different positions. Fig. 16 is an enlarged detail, being a view of the pin and showing the condition in which the wire is left after the forming of the interlocking eye. Figs. 17 and 18 are enlarged details, being views of the coiling mechanism in two different positions, showing the coiling of the wire. Figs. 19 and 20 are enlarged details, showing the condition of the wire at the beginning of the coiling and at the end thereof, with the pin or mandrel in position. Figs. 21 and 22 are enlarged details, being illustrative sketches of the interlocking eye and of the coils at the beginning of the coiling and at the end thereof. Fig. 23 is a view of the knot formed on the wire, of natural size; and Fig. 24 is an enlarged detail, being a view of one of the cams hereinafter described.

Referring to the drawings, 26 indicates a bench or table upon which the machinery is supported and having located near the center thereof an upright or standard 27, provided with arms 28 and 29, which project forward toward the front of the machine. The standard 27 is firmly secured to the bench 26 in any appropriate manner and is best shown in Fig. 7.

30 indicates a driving-shaft which is journaled in suitable bearings supported upon the bench 26 and driven by a pulley 31.

32 indicates a clutch which is feathered upon the shaft 30, so as to rotate with it, and is provided with clutch devices upon each side thereof.

33 indicates a clutch which is rotatably mounted upon the shaft 30 and is adapted to engage with one side of the clutch 32.

34 indicates a bevel-gear which is secured to the clutch 33, so as to rotate therewith.

35 indicates a beveled gear which is journaled in suitable bearings mounted on the bench 26 and meshes with the beveled gear 34.

36 indicates a pinion which is secured upon the same shaft as the beveled gear 35 and rotates therewith.

37 indicates a gear which is mounted upon a shaft 38, journaled in suitable bearings upon the bench 26, and is best shown in Figs. 4 and 5. The gear 37 meshes with the pinion 36, so as to be rotated therewith. Near the other end of the shaft 38 is mounted a friction-pulley 39, and the shaft 38 is supported at its forward end in a journal 40, carried by an upright 41, secured to the bench 26.

42 indicates a gear which is mounted upon a shaft 43 and meshes with the gear 37. The shaft 43 is journaled at its inner end in a suitable journal supported by the bench 26 and at its forward end is journaled in a journal-box 44, which is slidingly mounted in the upright 41.

45 indicates a friction-pulley which is secured on the shaft 43 near its forward end above the friction-pulley 39.

46 indicates an expansion-spring which is mounted in the upright 41 and bears upon the journal-box 44, so as to press the friction-pulley 45 down upon the friction-pulley 39, whereby when the same are rotated the wire is fed by engagement between the two pulleys.

47 48 indicate uprights which are mounted upon the bench 26.

49 indicates a shaft which is journaled in uprights 47 48.

50 indicates a pulley which is keyed or otherwise secured to the inner end of the shaft 49 and is adapted to carry a belt 51.

52 indicates a gear which is keyed or otherwise secured to the shaft 49 and meshes with the gear 42.

53 indicates a wheel which is keyed or otherwise secured to the shaft 49 and is provided with a cam-groove 54 on its inner surface for purposes hereinafter described. The wheel 53 is provided with a cam projection 55 upon its periphery, as is best shown in Fig. 4.

Referring particularly to Figs. 3 and 4, 56 indicates a rod which is slidingly mounted in suitable bearings 57, which are secured to the bench 26. At its outer end the rod 56 carries an upright 58, which is secured to the rod 56, and is provided at its top with a roller 59. The roller 59 rests against the periphery of the wheel 53, and as said wheel rotates in the direction indicated by the arrow in Fig. 4 when the cam 55 strikes the roller 59 the upright 58 will be moved to the right in Fig. 4, carrying with it the sliding rod 56.

60 indicates a forked arm which is secured to the sliding rod 56 by a set-screw 61 and which projects inward to the clutch 32 and engages therewith by means of set-screws 62, which engage with a circumferential groove 63 (see Fig. 3) on the clutch 32.

64 indicates an arm which is keyed or otherwise secured to the sliding rod 56 near its inner end and carries upon its inner end a roller 65.

66 indicates a cylindrical block which is keyed or otherwise secured to the main driving-shaft 30 and has upon its periphery a cam projection 67 of wedge shape with curved sides, as is best shown in Figs. 3 and 4. The cam 67 is adapted to engage with the roller 65, so as to move the same to the right or left, according to the position in which the roller 65 lies with reference to said cam 67.

In Figs. 3 and 4 the rod 56 is shown in a position which is at the extreme limit of its motion to the left, the clutch 32 being engaged with the clutch 33, so as to operate the gear 34 and the gears meshing therewith and operate the feeding mechanism which feeds the wire into the machine before the knots are made. It is moved into this position by the devices hereinafter described.

When the wheel 53 rotates so as to throw the cam 55 against the roller 59, the shaft 56, as said above, is moved to the right a sufficient amount to disengage the clutch 32 from the clutch 33. This movement will also bring the roller 65 to the right so as to pass the point of the wedge-shaped cam 67, and as the cylindrical block 66 rotates with the shaft 30 the wedge-shaped cam 67 will contact the roller 65 and move the sliding rod 56 still farther to the right, so as to throw the clutch 32 into clutch engagement with the mechanism for driving the eye-forming and coiling mechanism, hereinafter described.

68 indicates a hand-lever which is pivoted at its rear end 69 to the bench 26 and is pivotally connected by a pin 70 with the sliding rod 56, so that the said rod 56 may be longitudinally moved by hand when desired.

71 72 indicate straightening-rollers mounted in pairs upon a bracket 73, supported on the bench 26 and having the axes of the pairs 72 at right angles with the axes of the pairs 71. The wire A from any appropriate coil passes between the straightening-rollers 71 and 72.

73 indicates a tube which is rotatably and slidingly mounted in journals 74 75 on the bench 26 and is adapted to permit the passage through it of the wire A, the wire A being led between the straightening-rollers 71 and 72 and the friction-rollers 39 and 45.

Referring particularly to Figs. 4 and 5, 76 indicates a shaft which is rotatably mounted in journals 77 78, mounted upon the bench 26. At one end of the shaft 76 is an arm 79, which is keyed or otherwise secured thereto and carries at its upper end a roller 80.

81 indicates a cam projection on the outer or front surface of the wheel 53.

82 indicates a spring which bears at one end upon the arm 79, tending to keep the roller 80 in contact with the front surface of the wheel 53. When the wheel 53 rotates as the the cam projection 81 is brought underneath the roller 80 and contacts the same, it throws the arm 79 forward, partially rotating the shaft 76.

83 indicates an arm which is keyed or otherwise secured to the other end of the shaft 76 and projects upward therefrom.

84 indicates an arm having a cutting edge 85 at its lower end. The arm 84 is pivoted to an upright 86, which is provided with an opening 87 near its top in register with the tube 73 and through which the wire A passes. The upper end of the arm 84 is connected by a link 88 with the upper end of the arm 83, so that when the shaft 76 is partially rotated, as above described, the arm 84 is swung and the cutting edge operates to sever the wire below it.

89 indicates a link which is pivotally connected at one end with the upper end of the arm 84 and at the other end is connected with a suitable registering device 90.

The registering device 90 may be of any approved form or construction and operates to register the number of links formed by the machine, being operated by each throw of the cutting-knife. As this registering device may be of any approved form or construction and forms no part of my present invention, I do not describe it more fully here.

Referring particularly to Figs. 1 and 4, 91 indicates an arm which is pivoted at its upper end to the upper end of the standard 48 and carries upon its forward surface a roller 92, which engages with the cam-groove 54 upon the inner surface of the wheel 53, so that as the said wheel is rotated the arm 91 is swung to the right or left.

93 indicates a connecting-rod one end of which is pivotally connected to the lower end of the arm 91 and the other end to an arm 94, the lower end of which is pivoted, as is indicated in dotted lines in Fig. 1, upon any suitable support located on the floor upon which the machine stands. The upper end of the arm 94 is provided with a slot 95.

96 (see Figs. 1 and 2) indicates a rod which is slidingly mounted in bearings 97 98. The bearings 97 98 are slotted below to permit the passage through them of cam projections 99 99$^a$, located upon the under side of the rod 96, the purpose of which is hereinafter described. The outer or right-hand end of the rod 96 engages by a pin 100 with the slot 95 on the upper end of the arm 94, so that as the said rod 94 is swung by the operation of the cam-groove 54 the rod 96 will be moved longitudinally in its bearings. The relative lengths of the rods 91 94 are so adjusted with relation to the position and shape of the cam-groove 54 that the rod 96 will be moved longitudinally a distance equal to the length of the link of checkrower wire, formed as hereinafter described.

Particularly referring to Figs. 12 and 13, 101 indicates a wire-gripping device consisting of an arm 102 and lever 103. The arm 102 is keyed upon or otherwise secured to the rod 96 near its outer or right-hand end. The lever 103 is pivoted to the arm 102 by means of a pin 104.

105 indicates a spiral spring, which is mounted upon a pin 106, which is secured at its inner end to the arm 102, passing through the upper portion of the lever 103 above the pivot 104, so as to permit the lever 103 to be rocked upon its pivot. The spiral spring bears at one end against the surface of the lever 103 and at the other end against a nut 107 upon the outer end of the pin 106 and tends to press the upper arm of the lever 103 against the arm 102. As is best shown in Fig. 13, the upper ends of the arm 102 and of the lever 103 are cut away from each other, so as to form a wedge-shaped opening, widest to the left, through which the wire A passes; but they are adapted to close upon the wire, so as to grip the same between them, and the back or right end surface of the gripping devices 101 thus forms a bearing adapted to engage the knot in the check-rower wire hereinafter described and assists in pulling the knotted wire from the machine, as hereinafter described. The lower end of the lever 103 is provided with a roller 108, journaled upon its lower end.

Referring particularly to Figs. 1 and 2, 109 indicates a plate which is secured at its inner end to the bench 26 and projects outward therefrom. The upper surface of the plate 109 is provided with a double cam-groove 110, in which the roller 108 moves. The groove is narrowed at its outer or right-hand end, so as to form a single groove, as is best shown in Fig. 2, and is divided a short distance from its right-hand end into two grooves extending backward a suitable length by a shoulder 111 and by a switch 112, which is pivoted at the right-hand or outer end of the shoulder 111, so as to form a single track 113 at the outer end and a double track 114 115 the rest of the distance. The rollers 108 as the sliding rod 96 is carried outward to the right will thus rest in the track 114, which is so located that when the roller rests therein the spring 105 closes the gripping devices together at the top. The roller 108 will travel thus in the straight track 114 during the entire distance of the movement to the right of the sliding rod 96, the gripping devices thus remaining closed upon the wire during this entire motion. When the return movement of the sliding bar 96 to the left begins, the roller will travel directly backward for a short distance in the single part of the track 113, the gripping devices thus remaining closed while the roller is so traveling. When the roller meets the switch 112 in this backward movement, it will be deflected thereby into the groove 115, opening the gripping device until the same reaches the backward limit of its motion, at which time the roller will pass beyond and to the left of the shoulder 111, leaving the spring thus free to close the gripping device 101.

116 (see particularly Figs. 10 and 11) is an upright which is bolted to the bench 26 and is provided at its upper end with a head 117. The head 117 is provided with a semiconical opening 118 and with a semicylindrical groove, through which the wire A passes.

119 indicates an arm which is pivoted at its lower end to the upright 116 and is provided at its upper end with a head 120, which corresponds with and forms the complement of the head 117, and is provided with a semiconical opening and a semicircular groove which register with the semiconical opening and semicircular groove on the head 117, as is best shown in Fig. 10. The arm 119 is provided with a short arm 121, which projects outward therefrom and is provided with a roller 122 upon its outer end and which bears against the under side of the sliding rod 96, being held against the same by a spring 123, which operates to normally close the upper portions of the upright 116 and arm 119 in the position shown in Fig. 10. When the sliding rod 96 is longitudinally moved, the cam projections 99 99ᵃ upon its lower side contact with the roller 122 and force the arm 121 downward, so as to separate the upright 116 and arm 119 and permit the passage through the head of a knot upon the wire A, as hereinafter described. The upright 116 is placed upon the bench 26 in such a position that it is a distance of a half a link's length from the loop and coiling devices, hereinafter described, and so that the knot, hereinafter described, formed upon the wire is in the head in the position shown in Fig. 11 at the time when the cutting-knife, above described, operates. The groove between the two heads is of such size as to hold the wire when the heads are in contact.

124 (see Fig. 3) indicates a clutch member which is rotatably mounted upon the shaft 30 and is adapted to engage with the clutch member 32 when the same is moved to the right.

125 indicates a pinion which is secured to the clutch member 124, so as to rotate with it.

126 indicates a gear which is keyed or otherwise secured to a shaft 127, which is journaled in suitable journals 128, mounted upon the bench 26.

129 (see Fig. 1) indicates a gear which is keyed or otherwise secured to the shaft 127 near its other end.

130 indicates a pinion which is keyed or otherwise secured to the shaft 127 near the gear 126.

131 indicates an idler-gear which is journaled in a standard 132, secured to the bench 26, as is best shown in Fig. 6, and meshes with the gear 126.

133 indicates a gear which is keyed or otherwise secured to the tube 73 and meshes with the idler-gear 131.

134 indicates a tube adapted to permit the passage of a wire through it, which is journaled and slidingly mounted in suitable bearings 135, mounted upon the bench 26, facing and in alinement with the tube 73.

136 indicates a pinion which is keyed or otherwise secured to the tube 134 and meshes with the gear 129.

When the clutch 32 is thrown into engagement with the clutch 124, the motion of the driving-shaft 30 is communicated to the pinion 125, from thence to the gear 126, rotating the shaft 127. By means of the idler-gear 131 and the gear 133 the tube 73 is rotated, and by means of the gears 129 and 136 the tube 134 is also rotated. It will be observed that the tubes 73 and 134 thus rotate in opposite directions.

137, as is best shown in Figs. 3, 14, 15, 17, and 18, indicates hollow cylindrical heads or chucks, which are keyed or otherwise secured to the inner ends of the tubes 73 and 134 and rotate therewith. The heads 137, as has been said, are hollow—that is, they are bored longitudinally—so as to be in effect continuations of the tubes 73 and 134.

Referring particularly to Figs. 14, 15, 17, and 18, 138 139 indicate levers which are pivoted in suitable slots in the heads or chucks 137 by means of pins 140, one upon each side of each of said heads. The levers 138 139 are wedge-shaped, as is best shown in Figs. 14 and 15, and their inner ends are slightly bent upward, as is best shown in Fig. 18. The levers 138 carry upon their outer ends each a head 141, which, as is best shown in Fig. 8, is in plan view nearly semicircular and has its edges rounded off from the center toward the circumference. The inner edge of the said head is cut away on the arc of a circle, as is best shown in Fig. 8, concentric with the inner bore of the tubes 73 and 134. The levers 139 are also each provided with a head 142 at their outer ends, which is also in plan view nearly semicircular in shape, as is best shown in Fig. 8, but with the edges rounded away and cut away in the arc of a circle at the inner surface, as is best shown in Fig. 8. The heads 142 are provided with a projecting lug 143, as is best shown in Figs. 8, 14, and 15, which is adapted to engage with the ends of the wire after the forming of the interlocking eye, as hereinafter set forth.

144 145 indicate split rings, which encircle and slide upon the heads 137 over the levers 138 139. The rings 144 145 are secured to the ends of arms 146 147, (best shown in Fig. 3,) the other ends of which are pivoted to brackets 148 149.

150 indicates a gear which is keyed or otherwise secured to a shaft 151 and meshes with the gear 130. The shaft 151 is journaled in suitable bearings 152, secured to the bench 26.

153 154 indicate cams provided with cam-grooves 155 156, as is best shown in Fig. 3, and keyed or otherwise secured to the shaft 151. The arms 146 147 are provided with rollers 157 158, which enter and engage with the cam-grooves 155 156. When the shaft 151 is rotated by the connection through the several gears with the driving-shaft 30, the cam-grooves 155 156, bearing upon the rollers 157 158, operate to swing the arms 146 147 toward and away from one another, carrying with them the split rings 144 145. As the split rings slide toward each other their inner surfaces bear against the levers 138 139 and close the heads 141 142 together in the position shown in Figs 8, 17, and 18, so as to be in position for engaging the ends of the wire and coiling them, as hereinafter described, and bringing the semicircular openings together, so as to form a circular opening somewhat smaller than the knot formed, as hereinafter described. When the rings are moved by the operation of the cam-grooves in the opposite direction—that is, away from each other—the split rings bear upon the inner ends of the levers 138 139 and separate the heads from each other, as shown in Figs. 14 and 15. These motions are timed, as will be hereinafter described in describing the operation of the machine in detail.

159 indicates a bracket which is secured to and depends from the lower side of the bench 26.

160 indicates a standard which is bored longitudinally and is supported upon the upper surface of the bench 26 in alinement with the lower end of the bracket 159.

161 indicates a rod which passes through a suitable opening in the lower end of the bracket 159 and through the standard 160, so as to slide up and down freely longitudinally of itself therein.

162 indicates a block which is secured to the rod 161, near its lower end, between the bottom of the bench and the lower end of the bracket 159.

163 indicates a spiral spring which bears against the block 162 and against the lower end of the bracket 159, tending by its expansion normally to force the rod 161 upward. Upon the upper end of the rod 161, as is most clearly shown in Figs. 14, 15, 17, and 18, is secured the lower looper head or anvil 164, which is located between and at an equal distance from the coiling-heads 141 142 and which carries, projecting upwardly from its upper surface, a mandrel 165 and has upon each side of the mandrel a lug 166.

167 (see Fig. 7) indicates a lever which is pivoted to a support 168, depending from the lower side of the bench 26. The forward end of the lever is provided with a fork 169, which embraces the rod 161 and bears upon the upper surface of the block 162. The rear end of the lever 167 is pivotally connected to a pitman 170, the upper end of which is pivoted to an arm 171. The arm 171 is pivoted to the standard 29, extending rearwardly therefrom, as is best shown in Fig. 7, and has upon its lower surface a lug 172.

173 indicates a cam which is keyed or otherwise secured to the shaft 151 and is adapted in its rotation to contact with the lug 172 upon the under side of the arm 171. When the lug 172 is free from engagement with the projecting portion of the cam 173, the spring 163 tends to force the rod 161 upward longitudinally into the position shown in Figs. 14 and 15 and out of the alinement of the two coiling-heads 141 142. When in the rotation of the shaft 151 the cam 173 bears upon the lug 172, the arm 171 is forced upward, thus by means of the pitman 170 forcing the forward end of the lever 167 downward, in its turn forcing the rod 161 downward. The timing of this cam in this movement will be hereinafter described in describing the operation of the machine in detail. Upon each side of the lower looper head or anvil 164 is a lug 174, rounded in shape, as is best shown in Figs. 14 and 15, to assist in the shaping of the knot, as hereinafter described.

175 indicates a shaft which is journaled in bearings 176 177 upon the forward ends of the arms 28 and 29 and is also adapted to move freely, longitudinally of itself, in said bearings.

178 indicates the upper looper-head, which is secured to the lower end of the shaft 175 and is provided with downwardly-projecting lugs 179, which are adapted to engage the wires, as hereinafter described. Upon each side of the upper looper-head 178 and in the central line thereof is located a rounded projection 178$^a$, which corresponds with the rounded projection 174 on the lower looper-head to assist in the shaping of the knot, hereinafter described.

180 indicates a pinion which is feathered upon the shaft 175, resting between the bearings 176 177, so that the shaft 175 may slide in said gear, but will be rotated by the rotation of the said gear.

181 indicates a swinging segmental rack which is pivoted at its upper end to the bearing 176, as is best shown in Fig. 7, and is provided upon its lower portion, which is in the arc of a circle, with rack-teeth adapted to engage with the gear 180, so that when said segmental rack is swung, as hereinafter described, the gear 180 is intermittently rotated in one direction or the other.

182 indicates an arm which is pivoted at its lower end to the bench 26 and is connected at its upper end by means of a pitman 183 with the swinging segmental rack 181.

184 indicates a cam which is secured to the shaft 151 and rotates with it. This cam is best shown in Fig. 3, where one of the arms is cut away to illustrate its position. The cam 184 has a cam projection 185 upon its periphery and a cam-groove 186 upon the surface, which lies to the left in Fig. 3. (See also Fig. 24.) The arm 182 is provided with a roller 187, (shown in dotted lines in Figs. 7 and 24,) which engages with the cam-groove 186, so that by the rotation of the shaft 151 the arm 182 is swung forward and back, swinging the segmental rack 181 with it. The exact operation of this cam-groove, the exact timing thereof, and the exact motion given to the parts will be fully described hereinafter in describing the operation of the machine in detail.

188 indicates a lever which is pivoted to the top of the standard 27 and has at its forward end a fork 189, which engages with a bearing 190, secured to the upper end of the shaft 175. The other end of the lever 188 is connected by a pitman 191 with an arm 192, which is of the same shape as the arm 171 (shown in Fig. 7) and is pivoted at its forward end to the standard 27 upon the opposite side thereof from the arm 171. The arm 192 has upon its lower surface a lug corresponding in shape with the lug 172 on the arm 171 and not shown in the drawings. The arm 192 is located above the cam 184, so that as the same rotates the cam projection bearing upon the lug upon the under side of the arm 192 will raise the same, thus depressing, through the action of the lever 188, the looper-head 178 into alinement between the heads or chucks 137 in the position shown in Figs. 17 and 18 during the coiling operation hereinafter described.

193 indicates a contraction-spring, the upper end of which is secured to the arm 192 and the lower end to the bench 26 and tends to normally draw the arm 192 downward, lifting the shaft 175.

194 195 (see Fig. 1) indicate guides, which are pivoted at one end to the standards 74 and 135 and extend inwardly toward each other. Their inner ends are bent upward, as is best shown in Fig. 1, and are grooved, as is best shown in Figs. 14, 15, 17, and 9, at their top ends to receive the wires. When the same are thrown upward, their adjacent or inner ends lie one upon each side of the lower looper-head 164 and somewhat above the central line of the tubes 73 and 134. The guides 194 195 are provided with cam projections 196 197 upon their lower surfaces.

198 199 indicate arms, which are secured upon the sliding rod 56 and project upward and forward and are adapted when said sliding rod moves to contact with the cams 196 197 and to force the wire-guides upward into the position shown in Fig. 14. This movement is effected when the sliding rod 56 is moved to the right, as above described, throwing the clutch 32 out of engagement with the clutch 33 and into engagement with the clutch 134.

The operation of the above-described devices is as follows: Fig. 1 shows the parts in position after the interlocking eye and knots have just been completed, and for purposes of description of the operation I shall assume that this has just been done in the manner hereinafter described. The parts being then in the position shown in Fig. 1, with the clutch 32 in engagement with the clutch 33, so that what may be called the "feeding" mechanism is in operative position, the machine is started. The wire threaded, as has been above stated, between the straightening-rollers 71 72 and the feed-rollers 39 45 is fed into the machine through the tube 73 by the operation of said feed-rollers. The wire-gripping device 101 upon the bar 96 being at the inner end of its stroke grips the wire between the parts 102 and 103, and as the wheel rotates by the operation of the cam-groove 54 the lever 91 is swung to the right, carrying with it, through the connecting-rod 93, the lever 94, and thus carrying the sliding rod 96, with the gripping device 101 clutching the wire, to the extreme limit of its motion. It will be understood, of course, that the coiling jaws or heads 141 142 are open in the position shown in Figs. 14 and 15 to permit the passage of the just-formed knot between them. When the knot has reached the position in the head 120 shown in Fig. 11, the proper length of wire will have passed through the tube 73 to be severed by the knife 85, the operation of which, by means of the cam which drives it, is so timed as to then sever the wire. When the gripping device 101 has reached the extreme limit of its motion, it begins to return to its former position through the operation of the levers 94 and 91 and the cam-groove 54. As has been above described, it does not immediately release its clutch upon the wire, as the roller 108 still moves in the single portion of the track 113, and this portion of the track is of such length that the grip of the gripping device 101 upon the wire is retained a sufficient distance to return the severed end of the wire, which has passed by this operation beyond the looping and coiling device, back a short distance into the position shown in Fig. 14, so as to leave a sufficient length of the wire upon one side of the looping and coiling device and form one interlocking eye and coil. At this moment the heads 117 and 120 come together and hold the wire, so that the gripping device 101, opened by the operation of the groove 115 on the roller 108, slides upon the wire in the rest of the return stroke of the said gripping device 101. As this operation has been going on the following portion of wire severed by the knife has also been brought forward by the action of the feed-rollers 39 45 into the position shown in Fig. 14. Just at this moment the cam projection 55, coming in contact with the roller 59, moves the arm 58, and with it the sliding rod 56, to the right, beginning to throw the feeding mechanism out of operative engagement and, as this carries the arms 198 199, bearing upon the cam parts 196 197 of the guides 194 195, throws them up in the position shown in Fig. 14, so as to bend the wire up out of alinement with the coiler-heads, as shown in Fig. 14. By the operation then of the cam 67 the clutch member 32 is completely disengaged from the clutch member 33 and is thrown into engagement with the clutch member 124, which silences the entire feeding mechanism and begins to set in operation the interlocking eye forming and coiling mechanism. As the clutch member 124 is thrown into engagement with the clutch member 32, so as to be rotated with the rotation of the driving-shaft 30, the several gears above described are set in motion. The cam 173 being at this time free from engagement with the lug 172, the lower looper head or anvil 164 is thrown upward by the action of the spring 163 upon the block 162, secured to the shaft 161, into the position shown in Fig. 14. At the same time the cam 184, beginning its bearing upon the arm 192, throws the upper looper-head 178 down in position to engage the ends of the wires A' and A'', and the wire lies between the opposing surfaces of the two looper-heads 164 and 178. Just at this moment, referring to Fig. 24, which is a detail of the cam 184 and the devices acted upon by it, the cam portion 186$^a$ of the cam-groove 186 begins to bear at its inner end upon the roller 187, which operates to throw the lever 182 out, swinging the segmental rack 181 inward and rotating the gear 180, and with it the shaft 175 and lower looper-head 178, the lugs upon the lower surface of which engage the ends of the wires A' and A'', twisting the ends of the wires around the mandrel on the lower looper-head, so as to form interlocking eyes, the shape of which when finished is best shown in Fig. 16. The length of the tooth portion of the segmental rack 181 is such as to cause the gear 180, and with it the shaft 175 and upper looper-head 178, to make about three-quarters of a revolution, so as to bend the wires about the mandrel into the shape shown in Fig. 16. As this looping operation continues the cam portion 185 of the cam 184 continues to force the upper head down, forcing the lower head with it until as the loop is completed the wires are in alinement between the coiling devices hereinafter described, the guides 194 195 being in the meantime free from the engagement of the arms 198 199 with the cam projections 196 197, so that the guides drop back into the position shown in Fig. 15. At this time by the rotation of the cams 153 154 the levers 146 147 are moved toward one another, moving the rings 144 145 toward one another, so as to close the jaws or heads 141 142 together, as above described, and the tubes 73 and 134 and the heads or chucks 137 are moved inwardly toward each other to engage the ends of the wires left from the formation of the interlocking eye by the loopers or chucks, being meanwhile rotated by the rotation of the tubes or spindles 73 and 134 by the action of the several gears with the driving-shaft 30, as above described. At this moment the roller 187 passes from the portion 186$^a$ of the cam-groove 186 and moves into the portion 186$^b$, swinging the segmental rack 181 forward a portion of its distance, so as to bring the upper looper-head 178 into alinement with the lower looper-head 164, so that their sides are at right angles to the path of the wire. The portion 186$^c$ of the cam-groove 186 is circular, thus preventing any further swinging of the segmental rack 181 during the knotting or coiling operation. As the chucks or heads 137 approach close to the looper-heads, rotating as above described, projecting lugs 143 upon the heads 142 engage the free ends of the wires and coil them around the body of the wire, the wire being held by the gripping device 101, closed as above described. The first turn of the coil, as is illustrated in Figs. 19 and 21, is at the greatest distance from the interlocking eye, and as the chucks 137, continuing their rotation, move still closer to one another by the moving in of the rings 144 145 through the operation of the levers 146 147 and the cam-grooves 155 156 the coil is completed and each succeeding turn of the wire is wound toward the interlocking eye, forming the conical-shaped knot described in my Letters Patent before referred to and illustrated by a diagrammatic sketch in Fig. 22 and by the illustration of said knot in Fig. 23, the rounded projections 174 and 178$^a$ assisting in the shaping of the knot by bearing against the inner surfaces of the coils as the knot is formed. As soon as the knot is formed the cam 173, bearing upon the projection 172 on the lever 171, raises the same, moving with it the lever 167 and depressing the rod 161, and with it the lower looper-head 164, so as to free the mandrel from the interlocking eye formed around it, as above described. At the same time the cam-grooves 155 156 operate upon the rollers 157 158 to throw the levers 146 and 147 away from each other, carrying with them the split rings 144 145 and moving the chucks or heads 137 away from each other and at the same time opening the jaws or heads 141 142. As the lever 146 is moved to the left in Fig. 3 it strikes a lug 200, which is secured to the sliding rod 56, (best shown in Fig. 3,) moving the same to the left, so that the roller 65 passes to the left of the projecting point of the cam 67 and frees the clutch member 32 from the clutch 124, thus throwing the train of gears which operate the looping and coiling mechanism out of operation. The cam 67 rotating bears still further then upon the roller 65, causing it to move the sliding rod 56 still farther to the left, throwing the clutch 32 into engagement with the clutch member 33, and setting in motion the feeding mechanism, which thereupon begins to feed the wire forward against the knot which has just been formed, being free from the mandrel, and passes through the open jaws 141 142, and the operation above described is repeated.

In starting the machine for the formation of its first knot for its first operation the wire will be moved from the left by the feeding mechanism, so that the end A'' will be in the position shown in Fig. 14, and a separate piece of wire of the proper length will be inserted in the right-hand portion of the machine, so that its end is in the position shown at A' in Fig. 14. The looping and twisting mechanism being then set in operation, the interlocking eye and knots will be formed and the operation of making the wire continually proceeded with in the manner above described.

The check-rower wire as it is thus manufactured may be wound upon any suitable reel driven by the belt 51. As the reel may be of any suitable and well-known form and construction and located at any convenient place to the right of the machine and forms no part of my present application, it is not shown or described.

That which I claim as my invention, and desire to secure by Letters Patent, is—

1. In a machine for the manufacture of check-rower wire, a coiler consisting of a hollow chuck, levers pivoted on either side of said chuck and provided with heads, one of said heads having a lug adapted to engage with the ends of the wire and coil the same around the body of the wire when said chuck is rotated, combined with means for automatically causing said heads to move toward and away from each other, substantially as described.

2. In a machine for the manufacture of check-rower wire, the combination with a hollow chuck, means for rotating the same, levers pivoted on each side of said chuck and provided with heads, one of said heads having a lug adapted to engage the ends of the wire and coil the same around the body of the wire when said lug is rotated, and means adapted to bear upon said levers and automatically cause the said heads to move toward and away from each other, substantially as described.

3. In a machine for the manufacture of check-rower wire, the combination with a hollow chuck, means for rotating the same, levers pivoted on each side of said chuck and provided with heads, one of said heads having a lug adapted to engage the ends of the wire and coil the same around the body of the wire when said chuck is rotated, a ring embracing said chuck and said levers and adapted by its movement from side to side to bear upon said levers and cause said heads to move toward and away from each other, and means for moving said ring longitudinally of said chuck, substantially as described.

4. In a machine for the manufacture of check-rower wire, the combination with looping mechanism, of tubular spindles, one on each side of said looping mechanism, means for rotating said spindles in opposite directions, levers mounted on the inner ends of said spindles, one on each side thereof, provided with heads, one of said heads upon each spindle being provided with a chuck adapted to engage the free end of the wire after the loops are formed and coil the same around the body of the wire when said spindles are rotated, means for causing said spindles to approach each other to engage the ends of the wire and to cause the same to continue to approach each other during the coiling operation and to recede from each other when the coiling operation is completed, and means bearing on said levers and adapted to cause said heads to approach each other in order to engage said wire and coil the same, and to separate from each other when said coiling operation is completed, so as to permit the loops and coils to pass between said heads, substantially as described.

5. In a machine for the manufacture of check-rower wire, a coiling-head, consisting of a hollow chuck 137, wedge-shaped levers 138 139 pivoted opposite each other in the sides of said chuck and having, respectively, heads 141 142, a lug 143 on said head 142 adapted to engage the ends of the wire and coil the same around the body of the said wire, combined with a ring 145 embracing said chuck and bearing on said levers and adapted by its movement longitudinally of said chuck to cause said heads 141 142 to approach or separate from each other, and means for moving said ring back and forth longitudinally of said chuck, substantially as described.

6. In a machine for the manufacture of check-rower wire, the combination with looper mechanism, coiling mechanism and wire feeding and severing mechanism, of guides adapted to lift the ends of the wire out of alinement with said coiling mechanism and into position to be engaged by said looper mechanism, and mechanism for automatically raising said guides and lowering them after said looping is completed, substantially as described.

7. In a machine for the manufacture of check-rower wire, the combination with a looper-head 164 provided with a mandrel 165, a looper-head 178 adapted to engage the ends of the wire and loop the same around said mandrel, coiling mechanism adapted to coil the free ends of the wire around the body thereof after said loops are formed, of guides 194 195 adapted when raised to lift the ends of the wire out of alinement with said coiling mechanism and into position to be engaged by said looper-head 178, mechanism for automatically raising said guides and lowering them as said looping is completed, mechanism for rotating said looper-head 178, and mechanism adapted to bring said looper-heads together to engage the wire out of alinement with said coiling mechanism and to separate said heads when said coiling is completed, and to free the wire from the mandrel, substantially as described.

8. In a machine for the manufacture of check-rower wire, the combination with knotting mechanism, mechanism for automatically feeding the wire to said knotting mechanism and wire-severing devices, of a wire-gripper adapted to engage the knotted wire and draw the same through the machine after said looping and knotting is completed, mechanism for reciprocating said gripper, and mechanism for causing said gripper to retain its grip upon said wire for a portion of its return stroke, releasing said wire during the remainder of said stroke and gripping said wire again at the end of its return stroke, whereby the severed end of the knotted wire will move backward into position to be engaged by said knotting mechanism and held during said knotting operation, substantially as described.

9. In a machine for the manufacture of check-rower wire, the combination with knotting mechanism, mechanism for automatically feeding the wire to said knotting mechanism, and wire-severing devices, of a sliding bar, means for reciprocating said bar, a wire-gripper secured to said bar and adapted to engage the knotted wire and draw the same through the machine after said looping and knotting is completed, mechanism for reciprocating said sliding bar, and mechanism for causing said gripper to retain its grip upon said wire for a portion of its return stroke, releasing said wire during the remainder of said return stroke, and gripping said wire again at the end of its return stroke, whereby the severed end of the knotted wire will move backward into position to be engaged by said knotting mechanism and held during said knotting operation, substantially as described.

10. In a machine for the manufacture of check-rower wire, the combination with knotting mechanism, mechanism for automatically feeding the wire to said knotting mechanism, and wire-severing devices, of a sliding bar, means for reciprocating said bar, an arm 102 mounted on said bar, a lever 103 pivoted to said arm 102, a spring bearing on said lever 103 and adapted to normally cause one end thereof to press against said arm 102, and a cam-track adapted to engage the other arm of said lever 103 and by bearing on the same cause said arm 102 and said lever 103 to grip said wire between them during the outer motion of said bar and draw the said knotted wire through the machine, and to continue to engage said wire during a portion of the return stroke of said bar, to separate said arm 102 and said lever 103 during the remainder of the return stroke and to allow them to bear against each other again at the end of the return stroke, whereby the severed end of the knotted wire will be moved backward into position to be engaged by said knotting mechanism and held during said knotting operation, substantially as described.

11. In a machine for the manufacture of check-rower wire, the combination with a driving-shaft, wire-looping mechanism, wire-coiling mechanism, gearing for driving the same from said driving-shaft, feeding mechanism adapted to feed the wire to said looping and coiling mechanism and to drive the wire away from said looping and coiling mechanism when said looping and coiling are completed, and gearing for driving said feeding mechanism from said driving-shaft, of clutch mechanism mounted on said driving-shaft and adapted to engage with either set of gearing, and means for automatically alternately shifting said clutch mechanism to engage with the gearing for driving said wire-feeding device when said looping and coiling are completed, and to engage with the gearing operating said looping and coiling mechanism when said feeding is completed, substantially as described.

12. In a machine for the manufacture of check-rower wire, the combination of coiling mechanism and mechanism for operating the same, of a looper-head provided with a mandrel, another looper-head adapted to engage the ends of the wire, means for rotating the second looper-head to bend the ends of the wire around said mandrel and to then partially rotate said second head in a return direction until the same stands transversely of the axial line of said coiling mechanism and hold the same in said position until the coiling is completed, and thereupon to rotate said second head back to its original position, and mechanism for bringing said looper-heads together in position to engage the wire out of the axial line of said coiling mechanism and to bring said heads during said looping operation into alinement with the axial line of said coiling mechanism and then to separate said looper-heads and withdraw said mandrel from the loop, substantially as described.

13. In a machine for the manufacture of check-rower wire, the combination of a longitudinally-movable rod 161, a looper-head 164 mounted upon the upper end of said rod and provided with a mandrel 165, of a longitudinally-movable and rotatable rod 175, a looper-head carried at one end of said longitudinally-movable rod 175 and provided with lugs adapted to engage the ends of the wire and bend the same around said mandrel, means for longitudinally moving said rods 161 175 so as to bring said looper-heads together in position to engage the wire and to separate the same to free the completed knot from said mandrel, a pinion 180 mounted on said rod 175, a segmental rack 181 adapted to engage said pinion 180 and rotate the same as said segmental rack is swung, means adapted to swing said rack so as to rotate said head 178 and coil the ends of the wire around said mandrel, then to swing said rack partially backward holding the said rack stationary during the coiling operation, and then to complete the return swing so as to bring said looper-head 178 into its original position, and coiling mechanism adapted to coil the free ends of the wire after the formation of the loops upon the body of said wire, substantially as described.

14. In a machine for the manufacture of check-rower wire, the combination with looper-heads adapted to form interlocking eyes on said wire, and coiling mechanism adapted to coil the free ends of the wire after said eyes are formed upon the body of the wire in a conical form, of semiconical projections, one on each side of said looper-heads near the opposing edges thereof and located in the medial longitudinal line and adapted to bear against the inner side of the coils as the same are formed, and to coöperate with the coiling mechanism to form said conical coil, substantially as described.

JAMES W. PARKER.

Witnesses:
 IRENE FILSON,
 W. F. ELDER.